W. R. MILLER.

Piano-Forte Attachments.

No. 6,176. Reissued Dec. 15, 1874.

*Witnesses;*

J. F. DuHamel

Thomas Byrne

*Inventor;*

Wm. R. Miller

Per H. S. Abbot.

Attorney.

THE GRAPHIC CO. PHOTO-LITH. 39 & 41 PARK PLACE, N.Y.

UNITED STATES PATENT OFFICE.

WILLIAM R. MILLER, OF BALTIMORE, MARYLAND.

IMPROVEMENT IN PIANO-FORTE ATTACHMENTS.

Specification forming part of Letters Patent No. 154,066, dated August 11, 1874; reissue No. 6,176, dated December 15, 1874; application filed October 26, 1874.

*To all whom it may concern:*

Be it known that I, WILLIAM R. MILLER, of Baltimore, in the county of Baltimore and State of Maryland, have invented certain new and useful Improvements in Piano Sound-Insulating Attachment; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
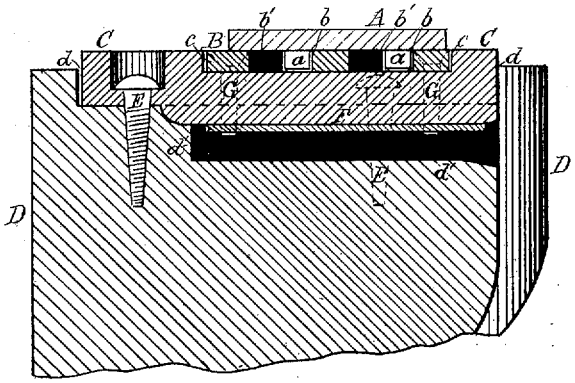
Figure 2:
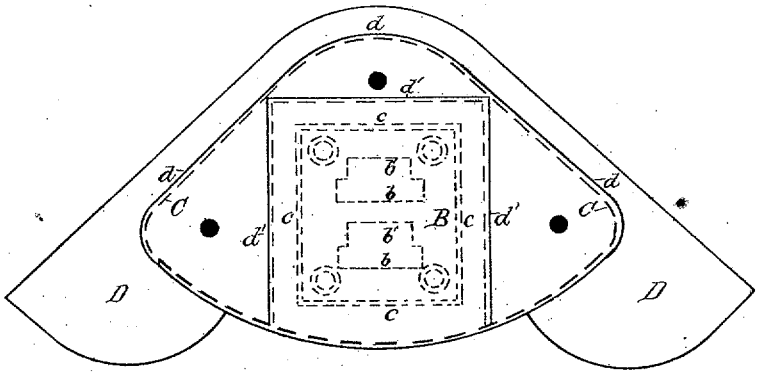

Figure 1 is a central vertical section. Fig. 2 is a top view of the piano-leg, the insulating-plate being shown in dotted lines.

The invention relates to a novel mode of applying a non-conductor of sound to a piano, so as to prevent its diversion and partial escape by way of the legs.

The means which embody the mode will first be fully described, and then pointed out in the claims.

A represents the piano-plate, which has dovetailed lugs *a a*, passing down into vertical holes *b b*, and laterally into dovetail grooves *b′ b′* of the plate B. C is an insulating-plate, made, preferably, of glass, but which may be made of any other material that is a non-conductor of sound. D is the top of a piano-leg, having a cavity, *d*, that receives the insulator C, leaving a certain portion thereof above its upper surface. This is held by countersunk screws E to the top D, while it has a recess, *c*, to receive the plate B, which is clamped thereto by means of a bottom plate, F, and screws G. The leg-top D has a smaller recess, *d′*, that receives the last-mentioned parts without suffering them to touch any of its surface.

By this construction of parts it is impossible for any portion of the sound to be transmitted by way of the legs to the floor.

Having thus described my invention, what I claim as new, and desire to secure by Letters Patent, is—

1. The combination, with the bottom plate or plank of a piano and the leg-top D of an interposed insulator, substantially as and for the purposes described.

2. The combination, with piano-plate, leg-top D, and their connecting-plate B, of the interposed insulator C, substantially as and for the purpose described.

In testimony that I claim the foregoing I have hereunto set my hand this 24th day of October, 1874.

WM. R. MILLER.

Witnesses:
J. F. DU HAMEL,
THOMAS BYRNE.